Aug. 13, 1946.    L. C. WHITON ET AL    2,405,625
DUST SEPARATOR
Filed Oct. 28, 1944
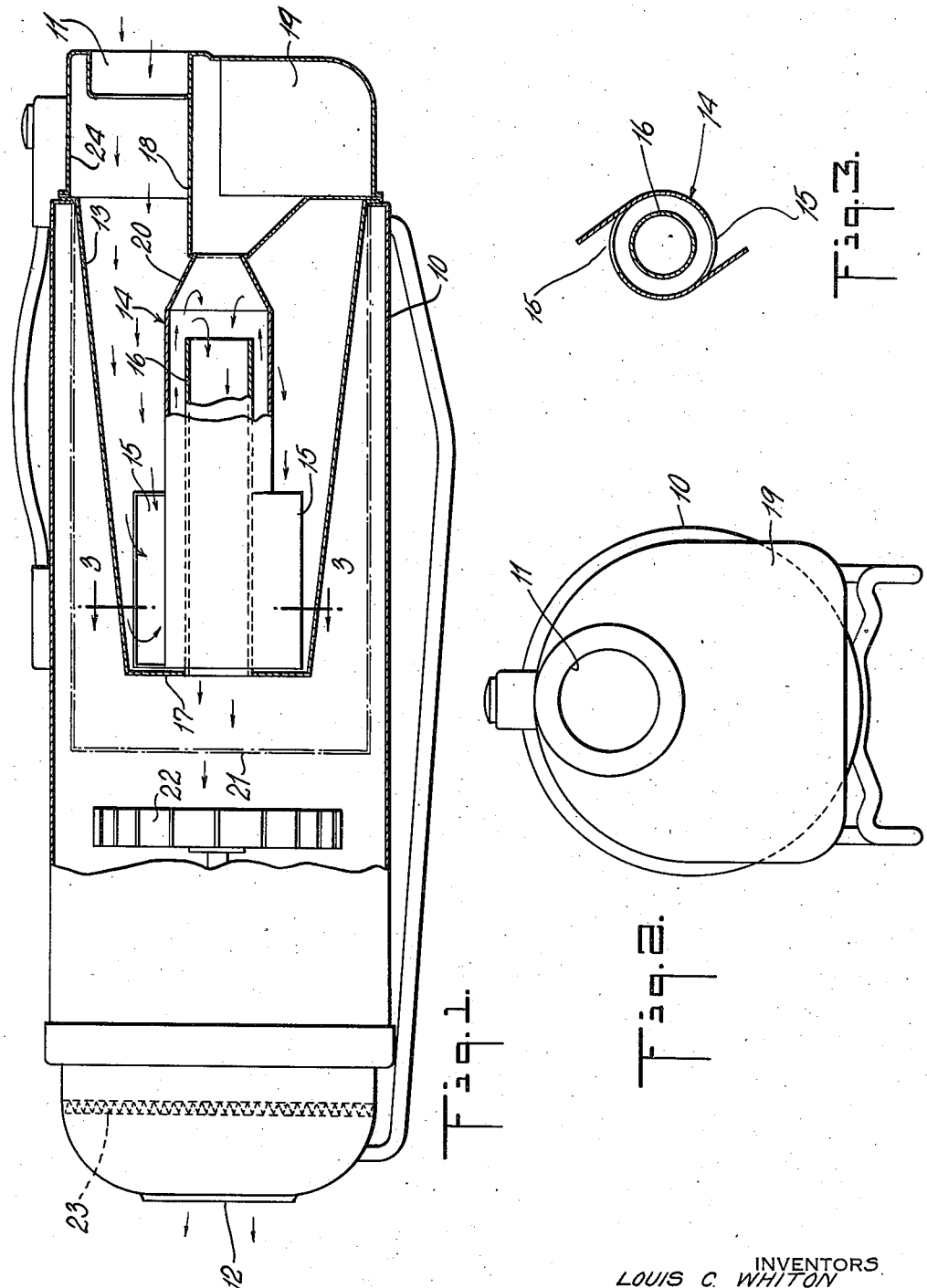
INVENTORS
LOUIS C. WHITON
JOHN E. WATSON
CHARLES B. McBRIDE
BY
Benj. T. Rauber
ATTORNEY Patented Aug. 13, 1946

2,405,625

UNITED STATES PATENT OFFICE 2,405,625

DUST SEPARATOR

Louis C. Whiton and John E. Watson, Westport, Conn., and Charles B. McBride, Port Chester, N. Y.

Application October 28, 1944, Serial No. 560,854

11 Claims. (Cl. 183—37)

Our invention relates to a dust separator or vacuum cleaning apparatus, particularly to a type of vacuum cleaner that relies primarily on a high degree of suction on the nozzle of the apparatus.

In vacuum cleaners of the above type the dust laden air has heretofore been drawn through a bag filter to a fan and then blown through a disc filter. Most of the dust is taken or removed from the air in passing through the bag filter and the small residual amount is separated on the disc.

In the apparatus of the above type the bag filter is a relatively small one because the design of the apparatus requires that it be contained within the apparatus itself. It must also be very efficient as a dust remover in order to protect the fragile construction of the high speed fan. Because of these limitations the bag itself offers considerable resistance to the passage of air.

In the case of a fan that produces a vacuum or pressure differential of 30 to 40 inches of water this would be reduced by 15 inches in passing through the bag itself. Owing to the small dimensions of the bag and its efficiency in separating dust, the separated dust will rapidly plug the openings or meshes in the fabric and thus rapidly increase the resistance of the bag. Accordingly a fan vacuum or suction of 30 to 40 inches of water may be reduced to 15 to 25 inches in passing through the bag, and as the bag fills with dust this may be still further reduced as low as 6 to 15 inches. This makes the apparatus less effective as a suction dust cleaner.

In our present invention we provide an apparatus in which a considerable quantity of the dust is removed from the air centrifugally before the air comes into contact with the meshes of the bag filter. For this purpose we have provided in front of the bag, and preferably extending into it, a housing or shroud which contains a centrifugal separator tube having an outlet delivering through the shroud to the inner surface of the bag. The centrifugal separator is provided with tangential inlets leading into an annular space formed between the wall of the separator and outlet tube. In entering through the tangential separators the air and suspended particles of dust are given a rapid whirling motion which throws the dust centrifugally against the inner surface of the centrifugal tube and forwardly and downwardly toward a dust collector at the opposite end while the air freed from the larger part of its dust content, for example, 90 per cent, then passes to the interior of the bag filter.

Inasmuch as 90 per cent of the dust is removed from the air current centrifugally the bag filter need take care only of the remaining 10 per cent and, therefore, it does not clog as rapidly.

The resistance of the centrifugal tube is very small, generally 5 inches of water. Owing to the fact that the major part of the dust is removed centrifugally the filter bag need not be so tight and its resistance may be reduced to about 10 inches of water or even 5 inches of water. This leaves a larger amount of the suction to be applied at the nozzle and enables the apparatus to be run a longer period of time without cleaning the bag filter.

The various features of the invention are shown, by way of example, in the accompanying drawing in which Fig. 1 is a longitudinal section of a filter embodying a preferred form of the invention;

Fig. 2 is an end view taken from the right of Fig. 1;

Fig. 3 is a section taken on the line 3—3 of Fig. 1.

In the embodiment of the invention shown in the accompanying drawing the apparatus is enclosed in an elongated casing or housing 10 having an inlet 11 at one end for attachment to a suction hose or nozzle, and an outlet 12 at the opposite end. Dust laden air is drawn through the inlet 11 into the interior of a shroud 13 of frusto-conical shape secured at its larger forward end to the wall of the chamber 10 and extending rearwardly therefrom. Mounted in the shroud 13 and substantially co-axially therein is a centrifugal separator 14. This separator comprises an outer tube having tangential inlets 15, (two being shown by way of example), delivering into an annular space formed between the outer wall and the inner off-take pipe 16 opening through the rearmost flat wall 17 of the shroud and extending forwardly into the tube 14 beyond the tangential inlets 15. The forward end of the tube 16 is open.

The air entering the shroud passes through the tangential inlets 15 into the annular space about the off-take tube 16 in which it is given a rapid circulatory and forward motion. As the air reaches the forward end of the off-take pipe 16 it passes inwardly and rearwardly while the momentum of the suspended particles thrown outwardly in a helix or spiral path on the surface of the separator 14 carries these particles into a dust receiving space 18. This space 18 may have a detachable cup 19 which may be removed at any time that the apparatus is not in motion and the collected dust removed without disturbing the other parts of the apparatus.

Preferably the forward end of the centrifugal tube 14 is contracted as at 20 to concentrate the suspended particles and prevent their passing backwardly after having passed into the dust space 18.

The air passing rearwardly through the outlet tube 16 is received within a filter bag 21 secured at its forward end to the wall 10 entirely enclosing and spaced from the shroud 13. The air distributes itself equally throughout the area of the bag and then passes through the bag to a motor driven fan 22 which creates the suction in the apparatus and thence through a disc filter 23 to the outlet 12.

In passing through the centrifugal separating tube the greater part of the dust is separated from the air. Generally the amount of dust separated will equal about 90 per cent of the dust content of the air leaving only 10 per cent to be separated in the bag filter 21, whereas heretofore the bag filter usually received and separated 99 per cent. It is only necessary, therefore, for the bag filter to separate 9 per cent of the original air content to attain the same result, namely a dust content of 1 per cent or less through the disc filter 23. It will be understood, of course, that the slight resistance of the air in passing through the centrifugal separator is not influenced or affected in any way by the amount of dust that has been separated in it. Consequently the resistance does not build up rapidly with the use of the apparatus as was the case when the dust laden air came initially into contact with the bag filter.

Moreover, as most of the dust is separated by the centrifugal separator the bulk of it may be removed by removing the dust cup 19 without disturbing the bag filter. To remove the bag filter the forward part 24 of the wall of the chamber 10 may be detachable and carry the shroud 13 and clamp the open edge of the bag. This forward part may be secured to the wall 10 by any suitable clamping means.

Through the above invention, therefore, we have provided a dust separating apparatus in which the drop in pressure or suction is greatly reduced with no rapid increase as the apparatus is used.

What we claim is:

1. Dust separating apparatus which comprises an elongated chamber having an inlet at its front end; an outlet at the opposite end; a disc filter in front of said outlet; a motor driven fan in front of said disc filter; a bag filter secured to the inner surface of said chamber and extending rearwardly in front of said fan; a shroud within said bag filter secured at its front open end to said chamber; a centrifugal separator within said shroud, said separator having an outlet tube opening through the rear end of said shroud and extending forwardly into said separator to form an annular passage therein and having tangential inlets to said annular passage and a dust receiving receptacle at the front end of said separator.

2. Dust separating apparatus which comprises an elongated chamber having an inlet at the front end; an outlet at the rear end; a bag filter secured to the wall of said chamber near its inlet end and extending rearwardly, a shroud within said bag filter secured at its open inward end to the wall of said chamber, and a centrifugal separator in said shroud having a forwardly projecting dust discharge end; an outlet pipe at the rear end delivering through said shroud and forming an annular passage in said separator and tangential inlets to said annular space.

3. Dust collecting apparatus which comprises a centrifugal separator having an exhaust pipe extending into said separator to form an annular space therein and having a tangential inlet to said annular space, a shroud enclosing said centrifugal separator and closed at one end about said exhaust pipe and open at the other end, a dust receiver to receive separated material from the end of said centrifugal separator opposite to said exhaust pipe and a bag filter enclosing the end of said shroud closed about said exhaust pipe and secured to the wall of said shroud.

4. A dust collecting apparatus comprising a chamber having an inlet end and an exhaust end, a centrifugal separator in said chamber having an exhaust pipe opening to said exhaust end and projecting centrally in said centrifugal separator to form an annular space therein, said centrifugal separator having a tangential inlet into said annular space, a shroud enclosing said centrifugal separator and closed about said exhaust pipe, the opposite end of said shroud being secured to the wall of said chamber to separate said chamber into an inlet compartment and an exhaust compartment and a bag filter within said exhaust compartment and enclosing said shroud.

5. A dust collecting apparatus comprising a chamber having an inlet end and an exhaust end, a centrifugal separator in said chamber having an exhaust pipe opening to said exhaust end and projecting centrally in said centrifugal separator to form an annular space therein, said centrifugal separator having a tangential inlet into said annular space, a shroud enclosing said centrifugal separator and closed about said exhaust pipe, the opposite end of said shroud being secured to the wall of said chamber to separate said chamber into an inlet compartment and an exhaust compartment and a filter between the exhaust of said centrifugal separator and the outlet end of said chamber.

6. A dust collecting apparatus comprising a chamber having an inlet end and an exhaust end, a centrifugal separator in said chamber having an exhaust pipe opening to said exhaust end and projecting centrally in said centrifugal separator to form an annular space therein, said centrifugal separator having a tangential inlet into said annular space, a shroud enclosing said centrifugal separator and closed about said exhaust pipe, the opposite end of said shroud being secured to the wall of said chamber to separate said chamber into an inlet compartment and an exhaust compartment, a dust receptacle at the end of said separator opposite said exhaust pipe, a bag filter in the exhaust compartment of said chamber enclosed about said shroud to receive air from the exhaust pipe of said centrifugal separator, and a fan in said exhaust compartment to draw air through said centrifugal separator and said bag filter.

7. Dust separating apparatus which comprises a chamber having an intake compartment and an exhaust compartment, a centrifugal dust separator in said intake compartment and having a central exhaust pipe delivering into said exhaust compartment and extending into said centrifugal separator to form an annular space therein, said centrifugal separator having a tangential inlet to said annular space, a dust collecting bin in said intake compartment to receive separated dust from said centrifugal separator, a bag filter in said exhaust compartment to receive air from the exhaust pipe of said centrifugal separator and means to draw air from said intake compartment through said centrifugal separator and bag filter and into said exhaust compartment.

8. Dust separating apparatus comprising a substantially tubular chamber having an inlet in its forward end and an outlet at its rear end, a detachable dust receptacle below said inlet, a centrifugal separator delivering at its forward end into said dust receptacle and extending rearwardly, an exhaust pipe within said centrifugal separator to form an annular space therein and opening rearwardly, said centrifugal separator having a tangential inlet to said annular space, a shroud enclosing said centrifugal separator closed at its rear end about said exhaust pipe and secured at its forward open end to the wall of said chamber, dividing said chamber into an inlet compartment and exhaust compartment, a bag filter in said exhaust compartment enclosing the rear end of said shroud and a suction fan in said exhaust compartment to the rear of said bag filter to draw air through said separator and said exhaust pipe and said bag filter.

9. Dust separating apparatus comprising a substantially tubular chamber having an inlet in its forward end and an outlet at its rear end, a detachable dust receptacle below said inlet, a centrifugal separator delivering at its forward end into said dust receptacle and extending rearwardly, an exhaust pipe within said centrifugal separator to form an annular space therein and opening rearwardly, said centrifugal separator having a tangential inlet to said annular space, a shroud enclosing said centrifugal separator closed at its rear end about said exhaust pipe and secured at its forward open end to the wall of said chamber, dividing said chamber into an inlet compartment and exhaust compartment, a bag filter in said exhaust compartment enclosing the rear end of said shroud and a suction fan in said exhaust compartment to the rear of said bag filter to draw air through said separator and said exhaust pipe and said bag filter, and a filter spanning said exhaust compartment to the rear of said fan.

10. Dust collecting apparatus which comprises a centrifugal separating tube having an open ended exhaust pipe extending from one end into said tube to form an annular space therein, said tube having a tangential inlet into said space, a shroud encircling said centrifugal separator and closed at one end about the outlet end of said exhaust pipe, said shroud being open at the opposite end and forming an enclosing space for said centrifugal separating tube.

11. Dust collecting apparatus which comprises a centrifugal separating tube having an open ended exhaust pipe extending from one end into said tube to form an annular space therein, said tube having a tangential inlet into said space, a shroud encircling said centrifugal separator and closed at one end about the outlet end of said exhaust pipe, said shroud being open at the opposite end and forming an enclosing space for said centrifugal separating tube and a bag filter mounted on said shroud to receive gases from said exhaust pipe.

LOUIS C. WHITON.
JOHN E. WATSON.
CHARLES B. McBRIDE.